United States Patent Office 3,384,676
Patented May 21, 1968

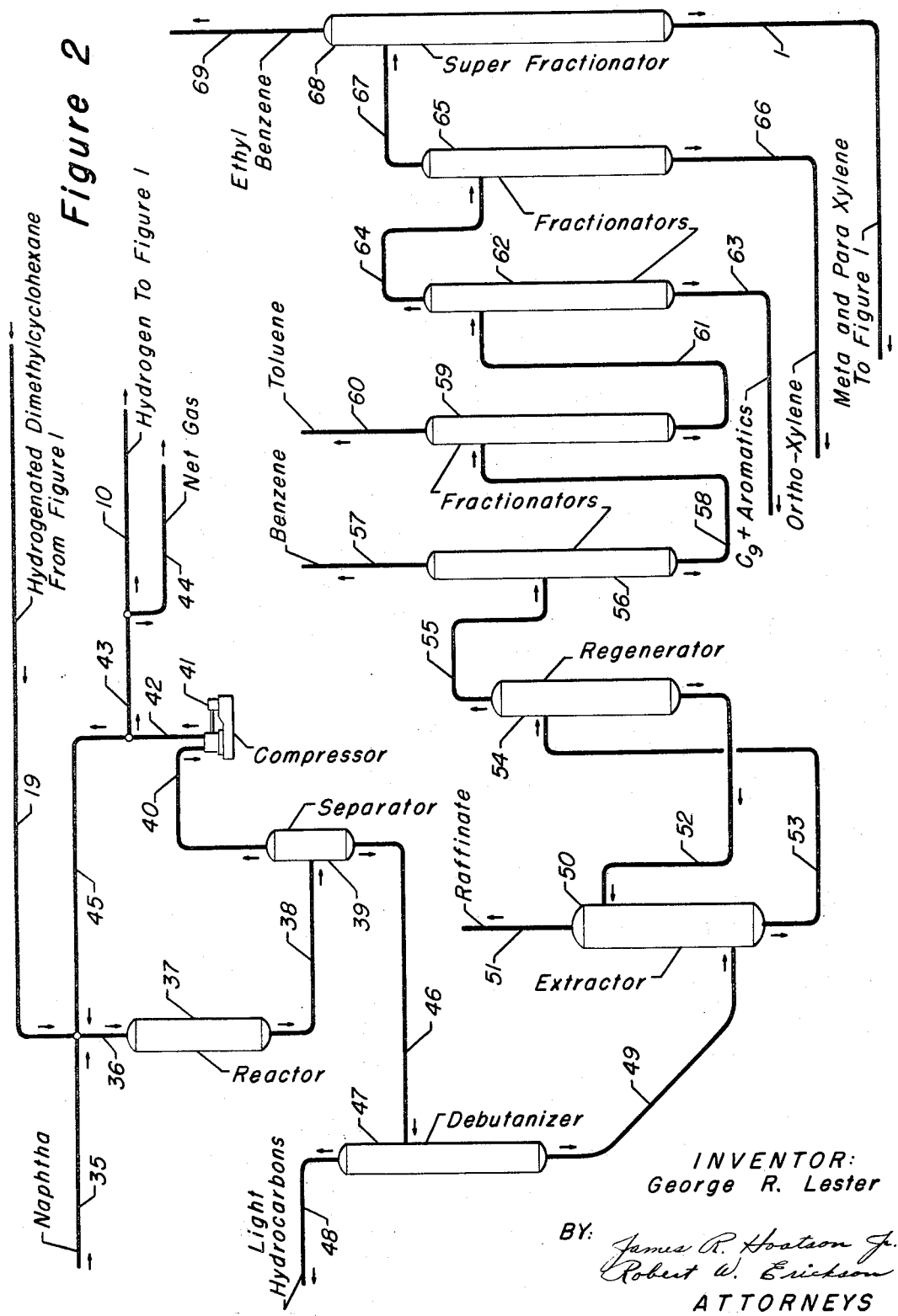

3,384,676
HYDROGENATION OF PARA AND
META XYLENE MIXTURES
George R. Lester, Mount Prospect, Ill., assignor to Universal Oil Products Company, Des Plaines, Ill., a corporation of Delaware
Filed Jan. 15, 1965, Ser. No. 425,834
8 Claims. (Cl. 260—667)

ABSTRACT OF THE DISCLOSURE

A process for the separation of para and meta xylene from mixtures thereof by hydrogenating the xylene mixture, separating the hydrogenated $C_8$ products by ordinary fractionation thereby producing a substantially pure 1,4-dimethylcyclohexane stream and dehydrogenating the 1,4-dimethylcyclohexane stream to produce a substantially pure para xylene stream, said process being further characterized by the utilization of a non-acid hydrogenating catalyst in the above hydrogenation step to produce a product whose geometric isomer distribution is such as to render at least a portion of the 1,4-dimethylcyclohexane readily separatable by ordinary fractionation.

Figure 1:
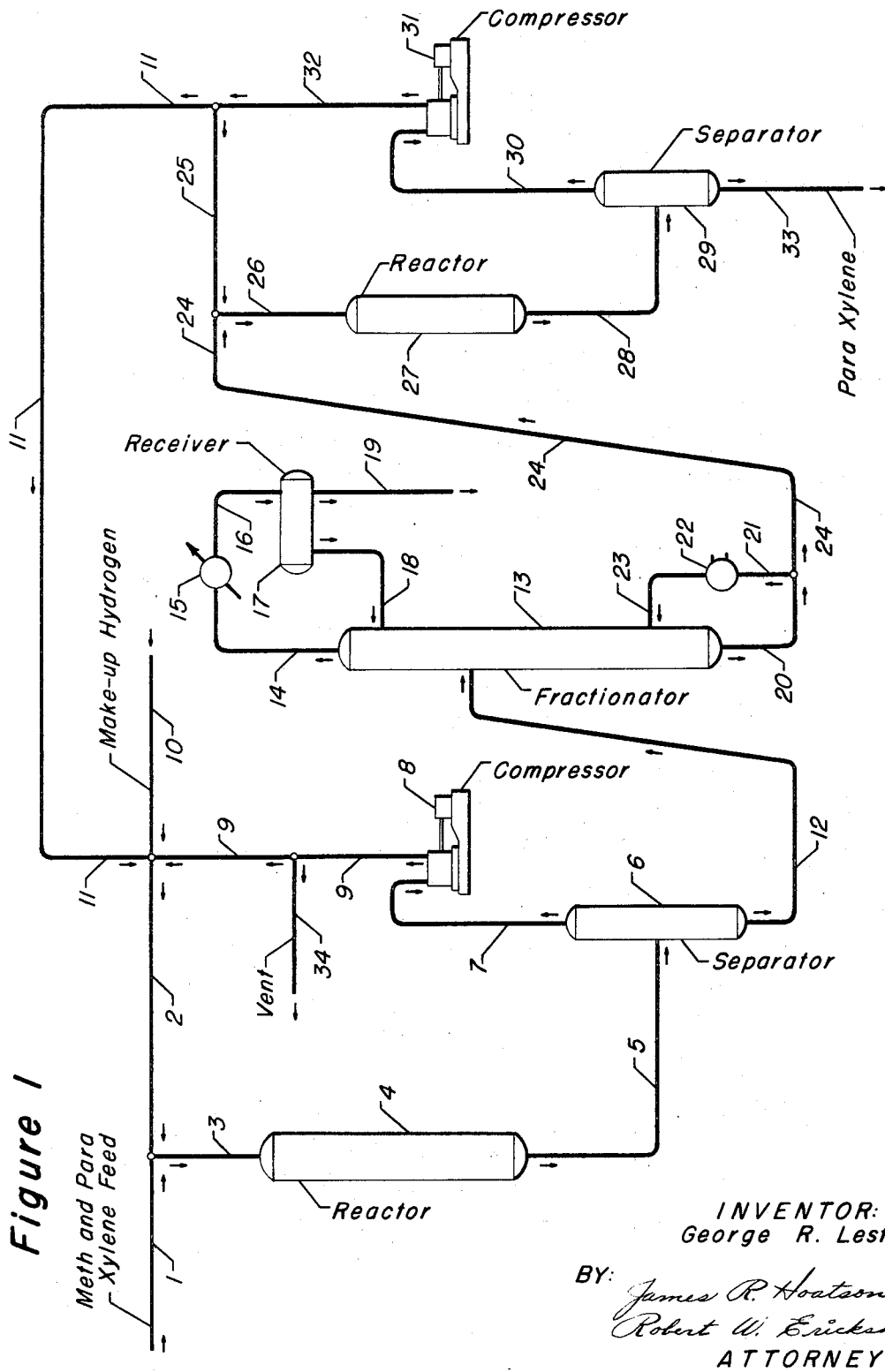

In one embodiments this invention relates to a process for the separation of para xylene from a fluid mixture comprising para xylene and meta xylene which comprises the steps: introducing said fluid mixture into contact with an alkali metal poisoned hydrogenation catalyst in the presence of hydrogen and hydrogenating the meta and para xylenes to the 1,3- and 1,4-dimethylcyclohexanes respectively, introducing the dimethylcyclohexanes into a fractionating distillation column and removing a substantially pure 1,4-dimethylcyclohexane stream from the bottom of said fractionating column, introducing said bottom stream into contact with a dehydrogenation catalyst at dehydrogenation conditions and removing the dehydrogenated product comprising para xylene.

There are four principal isomers in the $C_8$ aromatic hydrocarbon class, namely, ethylbenzene, ortho xylene, para xylene and meta xylene. All except the latter have large scale use of commercial value in the production of styrene, phthalic acid and terephthalic acid, respectively. However, said respective uses require that they be available in a substantially pure form, separate from their isomers. Generally $C_8$ aromatics are produced from petroleum processing units such as catalytic reformers and are readily separated from the other $C_8$ hydrocarbons by solvent extraction or the like. A typical $C_8$ aromatic fraction contains from 8–14% ethylbenzene, 18–24% ortho xylene, 17–21% para xylene and 45–53% meta xylene. Said fraction may be used in low value service such as a blending component to produce a high octane gasoline or as a solvent. However, in order to utilize the $C_8$ fraction in high value service for said respective uses, the $C_8$ isomers must be separated. The meta xylene has little high value commercial significance in its pure state and generally is used in low value service. Ortho xylene is easily separated from the $C_8$ mixture by ordinary fractionation due to its high boiling point. Although, it is more difficult to separate ethylbenzene from the ortho xylene-free $C_8$ aromatic mixture, nevertheless, it can be economically accomplished by direct fractionation using a more extensive fractionator and in fact is being done commercially at the present time. However, it is not economically feasible to separate meta and para xylenes from each other by direct fractionation. Since the meta and para boiling points are so close it would take an immense fractionator with many hundreds of trays to achieve the separation which would not be practical. Other methods have been employed in the past to achieve the separation of meta and para xylenes such as fractional crystallization. However, this method involves the handling of solids, the utilization of subatmospheric temperatures and is in general an expensive method to achieve the separation.

It is an object of this invention to economically separate para xylene from a mixture of para and meta xylenes.

It is another object of this invention to disclose a process to economically recover substantially pure para xylene from a mixture of para xylene and meta xylenes.

It is a more specific object of this invention to separate para xylene from a mixture of para and meta xylenes by selectively hydrogenating the mixture, recovering substantially pure 1,4-dimethylcyclohexane from the hydrogenated product by ordinary fractionation, and dehydrogenating said 1,4-dimethylcyclohexane to produce para xylene.

It is another more specific object of this invention to hydrogenate a meta-para xylene mixture to produce a predominantly cis form of the 1,4-dimethylcyclohexane.

It is still another more specific object of this invention to hydrogenate a meta-para xylene mixture while preventing the attainment of the equilibrium geometric isomer distribution of the hydrogenated product.

These and other objects will become more apparent in light of the following description.

As has been mentioned the separation of para xylene from a mixture of para and meta xylene by ordinary direct fractionation is not economically feasible due to their similarity in boiling points. The concept of hydrogenating said xylene mixture has also been considered in the past and has not been attempted due to the similarity in boiling points of the equilibrium geometric isomer distribution of 1,3- and 1,4-dimethylcyclohexane. Thus in U.S. Patent No. 2,282,231 issued in May 5, 1942, Mattox recognized the concept of hydrogenating a $C_8$ aromatic mixture followed by distillation of ethylcyclohexane from the remaining naphthenes, but shows only 1° C. difference between the boiling points of 1,3- and 1,4-dimethylcyclohexane. This difference is not sufficient to economically separate the xylene by fractionation. However, there are two geometric isomeric forms of both 1,3- and 1,4-dimethylcyclohexane, namely, the cis form and the trans form. The following table indicates the boiling points of these isomers.

| Compound: | Boiling point, ° C. |
|---|---|
| Cis 1,3-dimethylcyclohexane | 120.09 |
| Trans 1,3-dimethylcyclohexane | 124.45 |
| Cis 1,4-dimethylcyclohexane | 124.32 |
| Trans 1,4-dimethylcyclohexane | 119.35 |

It should be noted that there is over 4° C. difference in boiling points between the cis isomers of 1,3- and 1,4-dimethylcyclohexanes and this difference is sufficient to allow the economical separation of the isomers by direct fractionation. However, the equilibrium distribution of these geometric isomers is such that the average boiling point of the equilibrium mixture of the 1,3-dimethylcyclohexane isomers is very close to the average boiling point of the equilibrium mixture of the 1,4-dimethylcyclohexane isomers and accordingly the 1,3 compounds cannot be economically separated from the 1,4 compounds by direct fractionation.

I have observed that in the hydrogenation of both para and meta xylene, the cis form is predominantly formed as the direct or "kinetic" hydrogenation product. In the case of the 1,3-dimethylcyclohexane, the cis form is also predominant at equilibrium under hydrogenation conditions whereas in the case of the 1,4-dimethylcyclohexane the trans form is a predominant at said equilibrium. Therefore, after the xylenes have been hydrogenated, the 1,3- dimethylcyclohexane tends to remain in the cis form whereas the 1,4-dimethylcyclohexane tends to be converted by geometric isomerization from the cis form to the trans form. This conversion is undesirable since the boiling points of the 1,3-isomer and the 1,4-isomer tend to approach each other thus rendering separation by fractionation difficult if not impossible. Furthermore, this geometric isomerization reaction may be speeded up by an acidic catalyst. It is well known in the art that hydrogenation catalysts having a number of acid sites tend to catalyze isomerization reaction. I have found that by using a hydrogenation catalyst having few or preferably no acid sites, the geometric isomerization reaction can be minimized thus allowing the maintenance of predominantly the cis form of both the 1,3- and 1,4-dimethylcyclohexanes. Furthermore since equilibrium favors the cis form of the 1,3-isomer there is little tendency for it to convert to the trans form whereas whatever small amount of the cis form of the 1,4-isomer converts to the trans form will have a boiling point very close to the cis 1,3-isomer and therefore a stream of high purity cis 1,4-isomer can be withdrawn from the bottom of fractionator. Accordingly by using a non-acid hydrogenation catalyst in the hydrogenation of meta and para xylene, the cis form of 1,3 and 1,4-dimethylcyclohexanes are the predominant products with only a small quantity, if any, of trans 1,4-dimethylcyclohexane. Upon fractionation of this hydrogenated product a stream of cis 1,3-dimethylcyclohexane and perhaps a small amount of trans 1,4-dimethylcyclohexane is removed overhead while a cis 1,4-dimethylcyclohexane stream is removed from the bottom of the fractionator. Said bottom stream may be dehydrogenated over a non-acid dehydrogenation catalyst to produce a substantially pure para xylene stream which has a high value. The hydorgen evolved on the dehydrogenation step may be recycled to the hydrogenation step.

The process of this invention may be integrated with a reforming process and an aromatic extraction process as shown in FIGURE 2 to produce an overall superior combination process. The charge stock which is a naphtha having an Engler distillation within from about 180° F. initial boiling point to about 400° F. end point or less is introduced into flow conduit 35. The charge stock mixes with the material in flow conduit 19 described hereinafter and recycle gas in flow conduit 45 and the mixture is introduced into reactor 37 by means of flow conduit 36 said reactor containing a reforming catalyst such as platinum and a halide selected from the group consisting of chloride and fluoride on an alumina support at tempreatures of from about 800° F. to about 1000° F. and pressures of from about 150 p.s.i.g. to about 500 p.s.i.g. Since reforming produces hydrogen the normally gaseous reactor effluent is withdrawn from separator 39 through flow conduit 40, compressor 41, flow conduit 42 where a portion is returned to the reactor through flow conduit 45. The remaining portion of gas comprising hydrogen and light hydrocarbons flows through flow conduit 43 where a portion is sent to FIGURE 1 through flow conduit 10 while the remainder is withdrawn through flow conduit 44. The principal reactions that occur within said reforming reactor comprise isomerization, hydrocracking, dehydrogenation of naphthenes and dehydrocyclization of paraffin. The reactor effluent is withdrawn through flow conduit 38 into separator 39 where the normally liquid reformate is withdrawn through flow conduit 46 into debutanizer 47, out along flow conduit 49 where it is sent to an aromatic extraction unit such as by solvent extraction in which the aromatics in the reformate are recovered as a high purity stream. Typical solvents having a selectivity for aromatics comprise the glycol family such as dimethyleneglycol, trimethyleneglycol, triethyleneglycol, tripropyeneglycol, etc., sulfolane, etc. Generally, the reformate is contacted with a lean aqueous solvent in a countercurrent extractor wherein the aromatics are absorbed into the solvent phase. The resulting rich solvent is regenerated thus producing a substantially pure aromatic product. In FIGURE 2 the debutanized reformate is introduced into extractor 50 through flow conduit 49 while lean solvent is introduced into extractor 50 through flow conduit 52. A non-aromatic raffinate is withdrawn through flow conduit 51 while the rich solvent is withdrawn through flow conduit 53 into regenerator 54. The aromatics are withdrawn through flow conduit 55 whereupon they are sent to a train of fractionators where they are individually separated by direct fractionation to produce pure benzene, toluene, $C_8$ aromatics, etc. The aromatics are introduced into fractionator 56 where substantially pure benzene is removed overhead while the $C_7^+$ aromatics are withdrawing through flow conduit 58 and introduced into fractionator 59. Toluene is withdrawn overhead through flow conduit 60 while the $C_8^+$ fraction is withdrawn through flow conduit 61 into fractionator 62. The $C_8$ aromatics are taken overhead through flow conduit 64 while the $C_9^+$ aromatics, if any, are withdrawn through flow conduit 63. The $C_8$ aromatics are introduced into fractionator 65 wherein substantially pure ortho xylene is removed from the bottom through flow conduit 66 where it may be used in the production of phthalic acid. The ortho xylene-free $C_8$ aromatic stream is introduced through flow conduit 67 into superfractionator 68 wherein substantially pure ethylbenzene is removed overhead through flow conduit 69 to be utilized in the production of styrene. The remaining $C_8$ aromatics containing para xylene and meta xylene are introduced into the process of this invention shown in FIGURE 1 through flow conduit 1. Numerous pumps, heaters, heat exchangers, control valves, etc. have been omitted in both FIGURE 1 and FIGURE 2 for the purpose of clarity and simplification but these omitted features will be apparent to those skilled in the art.

As shown in FIGURE 1, the meta-para xylene mixture flowing in flow conduit 1 mixes with recycle gas comprising hydrogen flowing in flow conduit 2, and the mixture flows through flow conduit 3 and into reactor 4 containing a non-acid hydrogenation catalyst. The hydrogenated product is withdrawn through flow conduit 5 whereupon it flows into separator 6. The normally gaseous product is removed from separator 6 through flow conduit 7 by means of compressor 8 where it is recycled back to reactor 4 by means of flow conduit 9. Make-up gas comprising hydrogen and light hydrocarbons from a portion of the excess reformer gas is introduced into flow conduit 10 where it joins the separator gas in flow conduit 9 while the gas in flow conduit 11 also joins the mixture to create the entire recycle gas flowing in flow conduit 2.

The normally liquid hydrogenated product comprising predominantly cis 1,3 and cis 1,4-dimethylcyclohexane is withdrawn from separator 6 through flow conduit 12 where it is introduced into fractionator 13. The overhead fraction comprising cis 1,3-dimethylcyclohexane is withdrawn through flow conduit 14, cooler 15, flow conduit 16 and into receiver 17. A portion of said overhead fraction is returned to fractionator 13 through flow conduit 18 as reflux. The net overhead product is withdrawn through flow conduit 19 where it is recycled back to reforming reactor 37. Said net overhead product is a particularly desirable material to recycle back to the reforming reactor since it is composed of substantially pure naphthenes. The most rapid reaction in a reformer is the dehydrogenation of naphthenes wherein one mole of naphthene yields one mole of aromatic and three moles of hydrogen. Since this reaction is rapid, the concentration of hydrogen in the reforming reactor increases thus producing enhanced reforming catalyst stability and higher overall yields. Since the recycled overhead is composed of the predominantly meta (1,3) form and the reforming catalyst promotes isomerization reactions, a portion of the 1,3 material will be isomerized as well as dehydrogenated to produce the equilibrium isomer distribution of ortho xylene, para xylene, ethylbenzene and meta xylene. Thus in overall effect, the desirable ortho and para xylene and ethylbenzene will be produced as net products from the overall combination process of FIGURE 2 while the meta xylene will be recycled to extinction while also enhancing the reformer by selectively introducing hydrogen into the reformer reactor.

The bottom fraction from fractionator 13 comprising cis-1,4-dimethylcyclohexane is withdrawn through flow conduit 20, where a portion flows through flow conduit 21, heater 22 and returns to fractionator 13 through flow conduit 23. The remaining portion flows through flow conduit 24 where it mixes with recycle gas flowing in flow conduit 25 and the mixture enters dehydrogenation reactor 27 by means of flow conduit 26. The dehydrogenated product comprising para xylene is withdrawn through flow conduit 28 where it flows into separator 29. The normally gaseous effluent leaves separator 29 where it flows through flow conduit 30, compressor 31, flow conduit 32 where a portion flows into flow conduit 25 and eventually back to reactor 27. The net gas comprising hydrogen flows through flow conduit 11 as an additional supply of hydrogen for hydrogenation reactor 4. The normally liquid effluent leaves separator 29 through flow conduit 33 and comprises substantially pure para xylene.

Since the make-up gas flowing into the process in FIGURE 1 through flow conduct 10 contains some light hydrocarbons in addition to hydrogen, some of the separator gas flowing in flow conduct 9 is vented to bleed off these light hydrocarbons such that the hydrogen purity of the separator recycle gas will remain high, and passes out through flow conduit 34.

The heart of this invention lies in utilizing a hydrogenation step in which the kinetic reaction products are preserved thus avoiding the geometric isomerization reaction. The catalyst in reactor 4 is a catalyst containing few acid sites and preferably having no acid activity. A preferable hydrogenation catalyst comprises an alumina support which has been treated with an alkali metal cation solution to neutralize any acid sites and having a Group VIII metal impregnated thereon. Especially preferable alkali metals comprise lithium, sodium and potassium while especially preferable Group VIII metals comprise platinum and nickel. Other non-acid supports may be utilized instead of alumina. Platinum is a very active hydrogenation metal and is incorporated on the catalyst in concentrations of from about 0.2 weight percent to about 2.0 weight percent and preferably about 0.75 weight percent. On the other hand, nickel is a less active hydrogenation metal and is incorporated on the catalyst support in concentrations of from about 1 weight percent to about 50 weight percent and preferably about 25 weight percent. The alkali metal concentration should be sufficient to neutralize all the acidity on the finished catalyst and generally concentrations of from about 0.01 weight percent to about 1 weight percent are sufficient although concentrations of about 0.2 to about 0.5 weight percent are preferable. The operating conditions utilized in the hydrogenation reactor 4 are pressures of from about 200 p.s.i.g. to about 800 p.s.i.g. and from 300 to 500 p.s.i.g., temperatures of from about 25° C. to about 300° C. and preferably from about 100° C. to about 200° C., liquid hourly space velocities of about 0.1 to about 1000 and preferably about 0.5 to about 300 and hydrogen to oil mole ratios of about 2 to about 20 and preferably about 3 to about 10.

Fractionator 13 may be operated at any convenient pressure although preferably, low pressures are employed to accentuate the difference between the boiling points of 1, 3, and 1,4-dimethylcyclohexanes. Since a large fractionator must be utilized to make the above split, low pressure drop stages such as low pressure drop trays should be employed in order to achieve an economical separation.

The dehydrogenation reactor 27 contains the alumina, alkali metal, Group VIII metal catalyst described hereinbefore in order to prevent any isomerization to the $C_8$ isomers when dehydrogenating the cis 1,4-dimethylcyclohexane to para xylene. The operating conditions utilized in the dehydrogenating reactor are pressures of from about 25 to 500 p.s.i.g. and preferably from 50 to 300 p.s.i.g., temperatures of from about 200° C. to about 450° C. and preferably from about 300 to about 400° C., liquid hourly space velocities of about 0.1 to about 10 and preferably about 0.5 to about 5 and hydrogen to oil mole ratios of about 2 to about 20 and preferably about 3 to about 10.

The following examples are included to further illustrate the novelty and utility of the present invention but not to limit the invention to the conditions or materials shown therein.

Example I

This example is included to illustrate that the utilization of an alkali metal hydrogenation catalyst to hydrogenate para xylene will result in a greater concentration of the cis 1,4-dimethylcyclohexane than the equilbrium geometric isomer distribution calls for. A hydrogenation catalyst having a 0.54 ABD is prepared having an alumina support, 0.75 weight percent platinum and 0.33 weight percent lithium. Twenty cc. of the above described catalyst is introduced into glass liner whereupon 100 cc. of para xylene is added to the glass liner and the liner and contents are pressured up to 200 atmospheres with hydrogen and sealed into an autoclave. The autoclave and contents are heated to a temperature of 200° C. and maintained at that temperature for a period of 1 hour at the end of which time the autoclave and contents thereof are cooled to room temperature and a sample of the liquid in the liner is taken and analyzed by gas chromatography. The liquid sample contained 35.2 weight percent trans-1,4-dimethylcyclohexane, 44.0 weight percent cis-1,4-dimethylcyclohexane, 20.5 weight percent para xylene and trace quantities of other xylenes. At these conditions, the equilibrium geometric isomer distribution of the cis- to the trans-1,4-dimethylcyclohexanes is about 25 to 75. It should be noted that the concentration of cis 1,4-dimethylcyclohexane is considerably higher than equilibrium calls for and in a continuous process in which the residence time in the reactor is considerably less than 1 hour it is expected that even higher concentrations of the cis-1,4-dimethylcyclohexanes will be produced.

Example II

A charge stock containing 65 weight percent meta xylene and 35 weight percent para xylene is introduced into a fixed bed of the catalyst described in Example I. This first reactor is surrounded by three block type heaters such that the reactor is maintained at substantially isothermal conditions. The temperature is maintained at 200° C. and the pressure is maintained at 500 p.s.i.g. in the reactor. Substantially pure hydrogen is introduced into the reactor on pressure control and the separator gas is recycled back to the reactor at such a rate as to maintain a hydrogen to oil mole ratio of 8 in the reactor. The normally liquid first reactor effluent is withdrawn from the reactor effluent separator and introduced into a first fractionator wherein a portion of the hydrogenated product containing primarily cis-1,3-dimethylcyclohexane is removed overhead. The bottoms stream from the first fractionator is sent to a second fractionator to remove the unconverted xylenes while also producing a substantially pure cis-1,4-dimethylcyclohexane stream. The latter mentioned stream is introduced into a second reactor containing a fixed bed of the catalyst described in Example I. The second reactor is maintained at a temperature of 400° C. and a pressure of 300 p.s.i.g. The normally liquid second reactor effluent is withdrawn from the second reactor effluent separator and, after removing the unconverted naphthenes, comprises a xylene stream containing para xylene of purity in excess of 95 weight percent.

Example III

This example is included to illustrate the improved reforming operation when charging a feed of enriched naphthene content as compared to a conventional naphtha to a reforming reactor. A fixed bed reactor containing a 0.375 weight percent platinum and 0.9 weight percent chloride on an alumina support catalyst is utilized as the reforming reactor. A naphtha charge stock having a 170° F. initial boiling point and a 300° F. end point by Engler distillation a paraffin content of 55 volume percent, a naphthene content of 35 volume percent and an aromatic content of 10 volume percent is introduced into the reforming reactor at a liquid hourly space velocity of 1.4, a pressure of 300 p.s.i.g. and a hydrogen to hydrocarbon mole ratio of 7. The temperature in the reactor is adjusted to maintain the octane number of the $C_5^+$ reformate at 95.0 F–1 clear.

Another run is subsequently made on a fresh batch of the same reforming catalyst at the same conditions as above utilizing a second different charge stock. The Engler distillation of this second stock has the same initial and end points but contains 45 volume precent paraffins, 45 volume percent naphthenes and 10 volume percent aromatics. The second charge stock is introduced into the reactor and the temperatures are adjusted to maintain the octane number of the $C_5^+$ reformate at 95.0 F–1 clear.

The results of the run with the first charge stock is compared with the results of the run with the second stock and the following conclusions are observed. The run with the second charge stock had about a 25% greater catalyst stability, an increased $C_5^+$ reformate yield of about 3.5 volume precent, an increased separator gas yield of about 125 standard cubic feet per barrel of charge and an increase in hydrogen purity in the recycle gas of about 5 mole percent. These results clearly indicate the desirable effect a charge stock of enriched naphthene content has upon a reforming process.

I claim as my invention:

1. A process for the treatment of a fluid mixture comprising para xylene and meta xylene which comprises the steps:

introducing said fluid mixture into contact with a non-acid hydrogenation catalyst having a support with a basic material thereon and a Group VIII metal in the presence of hydrogen and hydrogenating the fluid mixture to produce the 1,3 and 1,4-dimethylcyclohexanes, said 1,4-dimethylcyclohexane having a greater concentration of the cis geometric isomer than equilibrium, introducing the dimethylcyclohexanes into a fractionating distillation column and removing a substantially pure 1,4-dimethylcyclohexane stream from the bottom of said fractionating column.

2. The process of claim 1 further characterized in that the support is alumina, the basic material is lithium and the Group VIII metal is selected from the group consisting of platinum and nickel.

3. A process for the treatment of a fluid mixture comprising para xylene and meta xylene which comprises the steps:

introducing said fluid mixture into a reaction zone containing a non-acid hydrogenation catalyst comprising a Group VIII metal, an alkali metal and an alumina support, introducing hydrogen into said reaction zone while maintaining the zone at hydrogenating conditions thereby hydrogenating the para and meta xylene predominantly to the cis form of the 1,4- and 1,3-dimethylcyclohexane respectively, introducing said predominantly cis dimethylcyclohexanes into a fractionating distillation column and separating said dimethylcyclohexanes.

4. The process of claim 3 further characterized in that said alkali metal is selected from the group consisting of sodium, potassium and lithium and said Group VIII metal is selected from the group consisting of nickel and platinum.

5. A process for the preparation of naphthenes which comprises hydrogenating a mixture of meta xylene and para xylene in contact with a non-acid hydrogenation catalyst to form an isomeric mixture of 1,3- and 1,4-dimethylcyclohexanes predominating in the cis form of the isomers, and fractionating said isomeric mixture to separate the same into a predominantly cis 1,3-dimethylcyclohexane fraction and a predominantly cis 1,4-dimethylcyclohexane fraction.

6. The process of claim 5 further characterized in that said catalyst comprises an alumina support containing an alkali metal and a Group VIII metal.

7. In combination with a hydrocarbon reforming process, the steps of separating from the reformed products a mixture of meta xylene and para xylene, hydrogenating said mixture in contact with a non-acid hydrogenation catalyst to form an isomeric mixture of 1,3- and 1,4-dimethylcyclohexanes predominating in the cis form of the isomers, fractionating said isomeric mixture to separate the same into a predominantly cis 1,3-dimethylcyclohexane fraction and a predominantly cis 1,4-dimethylcyclohexane fraction, and supplying the first-mentioned fraction to the aforesaid reforming.

8. The process of claim 7 further characterized in that said xylene mixture is hydrogenated in contact with a catalyst comprising an alumina support containing an alkali metal and a Group VIII metal.

References Cited

UNITED STATES PATENTS

| | | | |
|---|---|---|---|
| 2,282,231 | 5/1942 | Mattox | 260—674 |
| 2,920,114 | 1/1960 | Bloch | 260—668 |
| 2,959,626 | 11/1960 | Krausse et al. | 260—674 |
| 2,987,560 | 6/1961 | Holmes et al. | 260—668 |
| 2,988,575 | 6/1961 | Hays et al. | 260—674 |
| 3,012,963 | 12/1961 | Archibald | 208—144 |
| 3,054,833 | 9/1962 | Donaldson | 260—667 |

DELBERT E. GANTZ, *Primary Examiner.*

C. E. SPRESSER, *Assistant Examiner.*